US011422663B1

(12) United States Patent
Tan et al.

(10) Patent No.: US 11,422,663 B1
(45) Date of Patent: Aug. 23, 2022

(54) STYLUS SENSING ON TOUCHSCREENS

(71) Applicant: STMicroelectronics Asia Pacific Pte Ltd., Singapore (SG)

(72) Inventors: Kien Beng Tan, Singapore (SG); Eng Jye Ng, Singapore (SG); Hon Siong Ng, Singapore (SG); Tong Tee Tan, Singapore (SG)

(73) Assignee: STMICROELECTRONICS ASIA PACIFIC PTE LTD., Singapore (SG)

( * ) Notice: Subject to any disclaimer, the term of this patent is extended or adjusted under 35 U.S.C. 154(b) by 0 days.

(21) Appl. No.: 17/332,357

(22) Filed: May 27, 2021

(51) Int. Cl.
*G06F 3/044* (2006.01)
*G06F 3/041* (2006.01)

(52) U.S. Cl.
CPC .......... *G06F 3/0441* (2019.05); *G06F 3/0442* (2019.05); *G06F 3/04166* (2019.05)

(58) Field of Classification Search
CPC .... G06F 3/038; G06F 3/03545; G06F 3/0346; G06F 3/016; G06F 3/03543; G06F 2203/0384; G06F 3/017; G06F 3/0441; G06F 3/0442; G06F 3/044
See application file for complete search history.

(56) References Cited

U.S. PATENT DOCUMENTS

| | | | |
|---|---|---|---|
| 9,632,622 B2 | 4/2017 | Hotelling et al. | |
| 10,216,333 B2 | 2/2019 | Zyskind et al. | |
| 10,241,597 B2 * | 3/2019 | Jung | G06F 3/0383 |
| 10,579,183 B2 | 3/2020 | Hara et al. | |
| 10,725,572 B2 | 7/2020 | Kim et al. | |
| 10,901,536 B2 | 1/2021 | Kadowaki et al. | |
| 10,955,964 B2 * | 3/2021 | Jung | G06F 3/0414 |
| 2017/0285771 A1 * | 10/2017 | Jung | G06F 3/0412 |
| 2018/0113519 A1 * | 4/2018 | Yamamoto | G06F 3/03545 |
| 2019/0146602 A1 * | 5/2019 | Kadowaki | G06F 3/0383 |
| | | | 345/174 |
| 2019/0171320 A1 * | 6/2019 | Kim | G06F 3/0416 |
| 2020/0201505 A1 * | 6/2020 | Jung | G06F 3/0414 |
| 2021/0055828 A1 * | 2/2021 | Miyamoto | G06F 3/0383 |
| 2021/0124473 A1 * | 4/2021 | Kim | G06F 3/04162 |

\* cited by examiner

*Primary Examiner* — Olga V Merkoulova
(74) *Attorney, Agent, or Firm* — Slater Matsil, LLP

(57) ABSTRACT

In an example, a method of sensing on a touchscreen including a plurality of touch sensors arranged in rows and columns on the touchscreen is described. The method includes detecting a passive touch on the touchscreen and a positon of an active stylus; determining a plurality of locations across the touchscreen corresponding to the passive touch and a positon of the active stylus, where each of the plurality of locations corresponds to a location of one of the plurality of touch sensors. The method includes transmitting a first uplink signal to a first group of the plurality of locations including a first fraction of the plurality of locations; and transmitting a second uplink signal to a second group of the plurality of locations including a second fraction of the plurality of locations, the first uplink signal being different from the second uplink signal.

20 Claims, 9 Drawing Sheets

Fig. 6B

STYLUS SENSING ON TOUCHSCREENS

TECHNICAL FIELD

The present invention relates generally to an electronic device and, in particular embodiments, to stylus sensing on touchscreens.

BACKGROUND

Electronic devices that are designed for user interaction have historically utilized external input devices such as keyboards, key pads, and/or mice to capture user input. In recent years, there has been a push away from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features.

Recently, active styluses have been used as human interface devices (HIDs). Active styluses allow the user touch the touchscreen with improved precision. For example, given the appropriate software, users are able to utilize active stylus for precise sketching, drawing, and hand writing.

SUMMARY

A method of sensing on a touchscreen including a plurality of touch sensors arranged in rows and columns on the touchscreen is described. The method includes detecting a passive touch on the touchscreen and a position of an active stylus; determining a plurality of locations across the touchscreen corresponding to the passive touch and a position of the active stylus, where each of the plurality of locations corresponds to a location of one of the plurality of touch sensors. The method includes transmitting a first uplink signal to a first group of the plurality of locations including a first fraction of the plurality of locations; and transmitting a second uplink signal to a second group of the plurality of locations including a second fraction of the plurality of locations, the first uplink signal being different from the second uplink signal.

A method of operating an electronic device includes determining a touchscreen is detecting passive touch and touch from an active stylus at a plurality of locations corresponding to a plurality of intersections between rows and columns of capacitive electrodes arranged across the touchscreen; determining a quantity of rows of capacitive electrodes and a quantity of columns of capacitive electrodes included in the plurality of locations; determining whether the quantity of rows of capacitive electrodes included in the plurality of locations is greater than the quantity of columns of capacitive electrodes included in the plurality of locations; determining a group of capacitive electrodes including a first fraction of the plurality of locations based on determining that the quantity of rows of capacitive electrodes included in the plurality of locations is greater than the quantity of columns of capacitive electrodes included in the plurality of locations, where the group of capacitive electrodes includes a location corresponding to the touch from an active stylus; transmitting a first uplink signal to the group of capacitive electrodes; and transmitting a second uplink signal to the remaining capacitive electrodes, the first uplink signal and the second uplink signal having opposite polarities.

An electronic device includes: a touchscreen; a processor; a memory for storing a program to be executed in the processor. The program includes instructions when executed cause the processor to: detect a passive touch on the touchscreen and a position of an active stylus; determine a plurality of locations across the touchscreen corresponding to the passive touch and a position of the active stylus, each of the plurality of locations corresponding to a location of one of the plurality of touch sensors; transmit a first uplink signal to a first group of the plurality of locations including a first fraction of the plurality of locations; and transmit a second uplink signal to a second group of the plurality of locations including a second fraction of the plurality of locations, the first uplink signal being different from the second uplink signal.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A, is a view of the electronic device in use, and FIG. 1B is the internal configuration of the electronic device;

FIG. 2A is the internal configuration of the active stylus, FIG. 2B is the internal configuration of a reception circuit of the active stylus, and FIG. 2C is the internal configuration of a transmission circuit of the active stylus;

FIG. 4A is a view of the electronic device in use, and FIG. 4B a schematic of the readout of the touchscreen 101 of the electronic device;

FIGS. 6A-6B is schematic illustrations of process steps of reducing the ground potential of a user's body when transmitting an uplink signal from the electronic device to an active stylus according to an embodiment of the present application, where FIG. 6A is a view of the electronic device in use, and FIG. 6B a schematic of the readout of the touchscreen of the electronic device.

DETAILED DESCRIPTION OF ILLUSTRATIVE EMBODIMENTS

To improve the user experience of a touchscreen with an active stylus, a touchscreen and an active stylus may communicate bi-directionally. In other words, the active stylus may be configured to send downlink signals to the touchscreen and receive uplink signals from the touchscreen.

The active stylus may receive the uplink signal from the touchscreen via a capacitive coupling between the active tip of the active stylus and the touchscreen. The active stylus analyzes the uplink signal by measuring the change in potential between the active stylus tip and a ground potential. Since the user is holding the active stylus, the active stylus is grounded via the user's body. The active stylus and the user share a common ground. If the user is holding the touchscreen chassis, then the active stylus, the touchscreen and the user share a common ground. Therefore, the active stylus analyzes an uplink signal by detecting the change in the potential between the active tip and the user's body. However, the touchscreen ground and the user do not share the same common ground, and therefore the active stylus may analyze the uplink signal incorrectly.

Thus, while touchscreens have led to great advances in the evolution of portable electronic devices, limitations still exist. Namely, touchscreens are not able to send detectable uplink signals to active styluses if the user is contacting the touchscreen (e.g. the stylus pen is poorly grounded).

Embodiments of the present invention relate to an electronic device that can send a detectable uplink signal to an active stylus regardless of the grounding condition of the active stylus. Various embodiments of the present application disclose a device and a method to supply a detectable uplink signal to an active stylus if a user is making contact with the touchscreen.

Figure 1A:
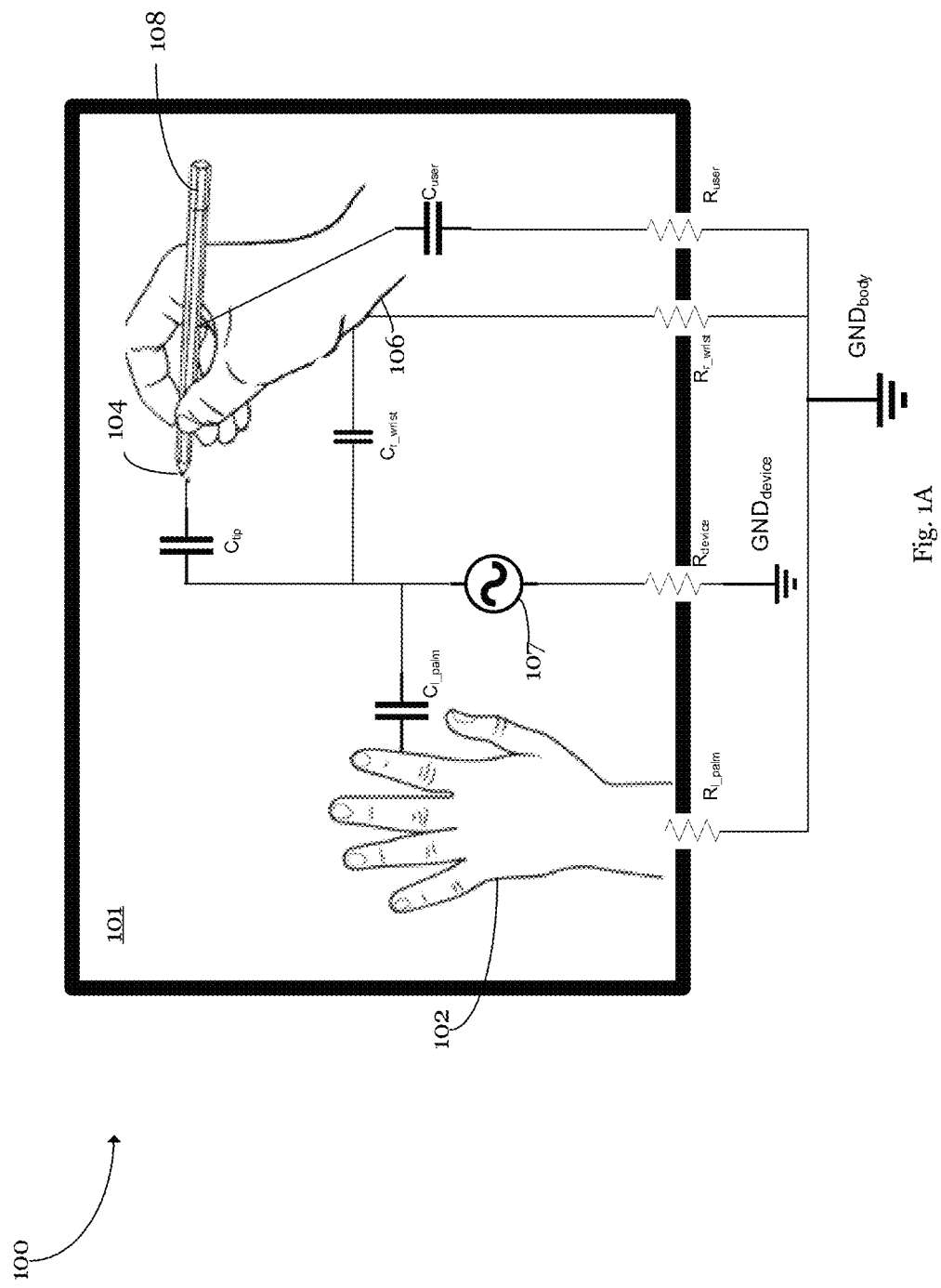
FIGS. 1A-1B are schematic diagrams of an electronic device according to an embodiment of the present application, where
Figure 1B:
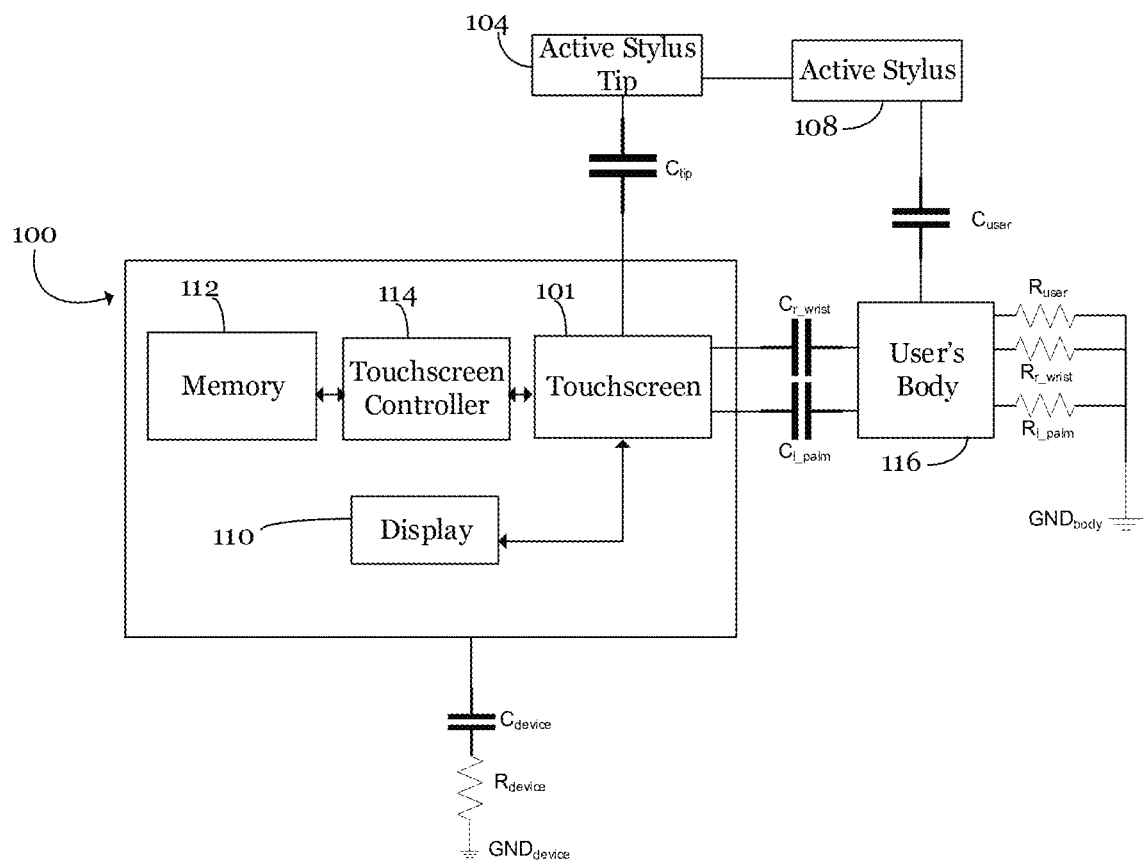

FIGS. 1A-1B are schematic diagrams of an electronic device according to an embodiment of the present application, where FIG. 1A, is a view of the electronic device in use, and FIG. 1B is the internal configuration of the electronic device.

Referring to FIG. 1A, the electronic device 100 may include a touchscreen 101 situated on a front face of the electronic device 100. The touchscreen 101 may be compatible with an active stylus 108. In various embodiments, the electronic device 100 may comprise a tablet, computer, smart phone, handheld gaming unit, or the like.

In one or more embodiments, the active stylus 108 may be held in a hand of the user and used to input more precise handwriting, drawings, sketches, and other inputs into the electronic device 100 while touching the active tip 104 of the active stylus 108 to the touchscreen 101.

In various embodiments, to improve the sensitivity between the touchscreen 101 and the active stylus 108, the touchscreen 101 and the active stylus 108 may communicate bi-directionally. The touchscreen 101 may be configured to transmit a signal 107 generated by a touchscreen controller to the active stylus 108 and receive signals generated and transmitted from the active stylus 108. The signal transmitted by the touchscreen 101 to the active stylus 108 may be defined as an uplink signal, and the signal transmitted by active stylus 108 to the touchscreen 101 may be defined as a downlink signal.

As understood by those with ordinary skill in the art, in embodiments where the electronic device 100 may be powered by a portable battery, the electronic device 100 along with its internal components may be grounded through resistance $R_{device}$ to $GND_{device}$ which is a non-earth ground.

In various embodiments, the active stylus 108 may comprise an active tip 104 comprising an active electrode made out of a conductive material such as metal, conductive paint, conductive ink, or any other suitable conductive material. The active tip 104 may be configured to function as an antenna configured to receive an uplink signal from the touchscreen 101 and transmit a downlink signal back to the touchscreen 101. After the touchscreen 101 detects the active tip 104 via the downlink signal, the touchscreen 101 may be configured to transmit an uplink signal to the active tip 104.

In an ideal working condition, the user contacts the touchscreen 101 using only the active stylus 108. Thus, potential change sensed at the active tip 104 can be compared with a reference potential, i.e., ground, and converted through the front-end analog circuitry to detect the uplink signal correctly, e.g., through a charge to voltage conversion circuit. The ground for this conversion circuit is provided by the user holding the active stylus 108.

However, in reality, the user likely contacts the touchscreen at multiple regions. Referring back to FIG. 1A, the user may hold the stylus with one hand (the right hand) with the right wrist 106 touching the touchscreen 101 while resting the other hand (the left palm 102) on the touchscreen 101.

When capacitive objects such as the user's body or active objects such as an active stylus are brought proximate to the touchscreen 101, they may be electrically coupled to it. Therefore, the user's left palm 102 may be coupled to the touchscreen 101 through capacitance $C_{l\_palm}$. The user's right wrist 106 may be coupled to the touchscreen 101 through capacitance $C_{r\_wrist}$. The active tip 104 may be coupled to the touchscreen 101 through capacitance $C_{tip}$.

As explained above, the active stylus 108 may be grounded via an user capacitance $C_{user}$ to the user holding the active stylus 108. In other words, the active stylus 108 and the user's body share a common ground $GND_{body}$. Therefore, the user's left palm 102, the user's right wrist 106, and the active stylus 108 are coupled to $GND_{body}$ via resistances $R_{l\_palm}$, $R_{r\_wrist}$, and $R_{user}$, respectively. In one or more embodiments, when the active tip 104 receives an uplink signal, the active stylus 108 may detect the uplink signal by comparing the potential at the active tip 104 and the potential of the user's body (e.g. $GND_{body}$). However, as identified by the inventors of this application, when the user is touching the touchscreen 101, the same uplink signal is also transmitting into the user, and this signal may cause the circuit ground to follow the same pulsing of the uplink signal, which will offset the signal being measured through the front-end circuitry of the active stylus 108.

As further described below, various embodiments avoid or cancel the effects of parasitic coupling introduced by the user while using the active stylus.

FIG. 1B illustrates an internal configuration of the electronic device in accordance with an embodiment of the present application.

Referring to FIG. 1B, the internal components of the electronic device 100 may include a display 110, a touchscreen 101, a memory 112, and a touchscreen controller 114 that are electrically coupled through a bus. In various embodiments, the display 11o and the touchscreen 101 may be integrated into the same component.

In various embodiments, the touchscreen controller 114 may be configured to process a downlink signal sent from the active stylus 108 and generate an uplink signal in response. The uplink signal may synchronize the touchscreen controller 114 with the active stylus 108 and may include a command. In one or more embodiments, further downlink signals may be transmitted by the active stylus 108 in response to the uplink signal. In one or more embodiments, the touchscreen controller 114 may be configured to determine the position of the active stylus 108 from the downlink signal, and send an uplink signal back to the active stylus 108.

As further described in more detail below, in various embodiments, the touchscreen controller 114 may be further configured to send different types of uplink signals in response to determining the position of the active stylus 108. More specifically, the touchscreen controller 114 is configured to divide the touchscreen into different regions and send different types of uplink signals to the different regions.

In various embodiments, the touchscreen controller 114 may include a processor that analyzes information and carries out a series of executable scripts, e.g., stored in the memory 112, based on user input. In one or more embodiments, the processor may comprise an application-specific integrated circuit (ASIC) device, a system on chip (SOC), or any other processing unit known in the art. In various embodiments, the touchscreen controller 114 may comprise a number of separate computing units such as cores integrated within one processor, or distinct separate processing chips. In other embodiments, some of the touchscreen controller 114 may be integrated with the touchscreen 101.

The memory 112 may be programmed for short term and/or long term memory storage. The memory 112 may comprise various programs to be executed in the touchscreen controller 114. The memory 112 may include both volatile and non-volatile memories. The memory 112 is designed to retain information generated by the touchscreen controller 114 so it can be recalled at a later time. In one or more embodiments, the touchscreen 101 may include sensors such as gyroscopes or accelerometers. One or more of the sensors may be integrated into a single component.

Referring back to FIG. 1B, the active stylus 108 may be electrically coupled to both the touchscreen 101 and the user's body 116. The active stylus 108 may be electrically coupled to the touchscreen 101 through an electric capacitance $C_{tip}$ between the active tip 104 and the touchscreen. The active stylus 108 may be grounded through an electric capacitance $C_{user}$ between the user's body 116 and the active stylus 108 formed by the user holding the active stylus 108. Therefore, the active stylus 108 and the user's body 116 share a common ground. As explained above, the active stylus 108 and the user's body 116 may be grounded differently than the touchscreen 101.

As explained above, when a user's body 116 touches the touchscreen 101, the user's body 116 is electronically coupled to the touchscreen 101. Therefore, the user's body may be electronically coupled to the touchscreen through a left palm capacitance $C_{l\_palm}$ and a right wrist capacitance $C_{r\_wrist}$.

Because of this, if the user is touching the touchscreen 101 when the touchscreen 101 transmits an uplink signal to the active stylus 108, the uplink signal may also be transmitted to the user's body 116. Referring back to FIG. 1A, the uplink signal may be transmitted to the user's right wrist 106, left palm 102, and the active tip 104. This may change the potential of the user's body 116 and distort the uplink signal received by the active stylus 108. In other words because the uplink signal is transmitted to the user's body 116, the uplink signal may also be transmitted to $GND_{body}$, resulting in a weakly grounded active stylus 108. Problematically, as explained above, the active stylus 108 detects the uplink signal by comparing the potential of the uplink signal at the active tip 104 to the potential of $GND_{body}$. Therefore, the active stylus 108 is weakly grounded and the uplink signal received by the active stylus 108 may be distorted.

Embodiments of the present application relate to an electronic device that can send an uplink signal to an active stylus when a user is touching the touchscreen.

Figure 2A:
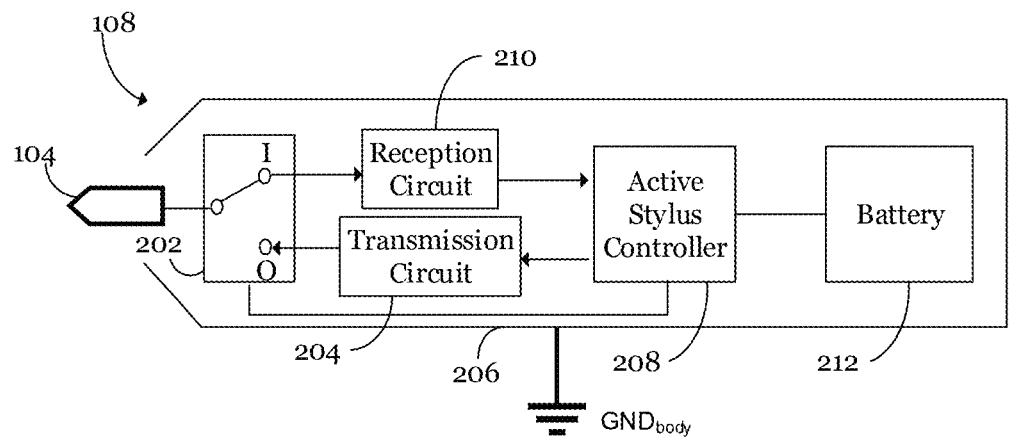
FIGS. 2A-2C are schematic diagrams of the internal configuration of an active stylus to be used along with various embodiments of the present application described in this application, where
Figure 2B:
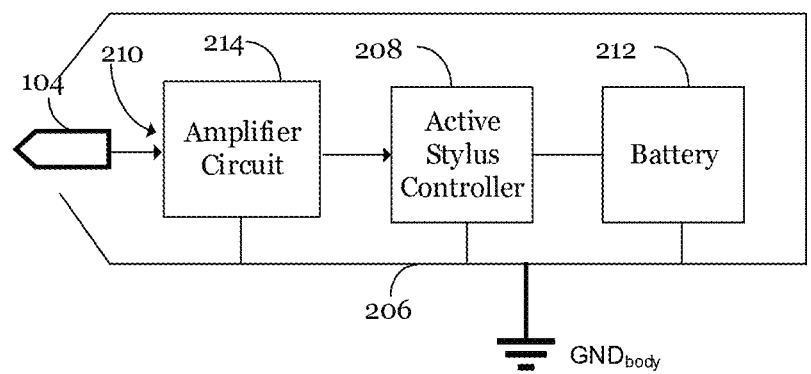
Figure 2C:
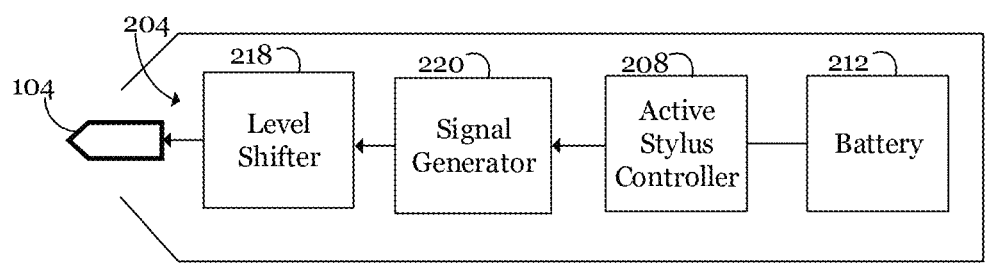

FIGS. 2A-2C are schematic diagrams of the internal configuration an active stylus to be used along with various embodiments of the present application described in this application, where FIG. 2A is the internal configuration of the active stylus, FIG. 2B is the internal configuration of a reception circuit of the active stylus, and FIG. 2C is the internal configuration of a transmission circuit of the active stylus. FIGS. 2A-2C illustrate the active stylus so that the embodiments of the present application can be more clearly explained subsequently. This, however, does not tie the implementation of the various embodiments to a specific design of the active stylus.

Referring to FIG. 2A, an active stylus 108 includes an active tip 104, a switch 202, a transmission circuit 204, e.g., a transmitter, an active stylus controller 208, and a reception circuit 210, e.g., a receiver, that may be powered by a battery 212.

In various embodiments, the active stylus controller 208 may be configured to receive an uplink signal from the reception circuit 210, process the uplink signal, and instruct the transmission circuit 204 to generate a downlink signal to be transmitted through the active tip 104. In one or more embodiments, the active stylus controller 208 is coupled to the switch 202. The active stylus controller 208 may be configured to move the switch 202 periodically between O and I based on duration of a transmission period and the duration of a reception period of the active stylus 108.

During a transmission period the active stylus controller 208 may set the switch 202 to O, connecting the active tip 104 to the transmission circuit 204 and a downlink signal may be transmitted to the touchscreen 101. On the other hand, during a reception period, the active stylus controller 208 may set the switch 202 to I, connecting the active tip 104 to the reception circuit 210 and an uplink signal transmitted by the touchscreen 101 may be received by the active tip 104.

In one or more embodiments, the transmission and reception periods of the active stylus 108 may be synchronized with a sensing mode and a transmission mode of the touchscreen 101. In other words, the touchscreen controller 114 via the uplink signal may be synchronized with the active stylus 108. Advantageously, this allows for the active stylus controller 208 to configure a reception period and a transmission period (e.g. move the switch 202 between I and O) based on when the touchscreen 101 is in a transmission mode or a sensing mode, respectively.

In various embodiments, the reception circuit 210 is a circuit configured to receive an uplink signal from the active tip 104 when the touchscreen 101 is in a transmission mode. In one or more embodiments, the input terminal of the reception circuit 210 is coupled to the active tip 104 and the ground terminal is coupled to the housing 206 of the active stylus 108. Therefore, the ground terminal of the reception circuit 210 may be coupled to the user's body 116 through the user holding the stylus, and thus, is coupled to the common ground $GND_{body}$. The reception circuit 210 may be configured to process an uplink signal received through active tip 104 and transmit the processed signal to the active stylus controller 208.

FIG. 2B is the internal configuration of a reception circuit of the active stylus according to an embodiment of the present application.

The reception circuit 210 may comprise at least one amplifier circuit 214. In various embodiments, the ground terminals of the amplifier circuit 214, the active stylus controller 208, and the battery 212 may be connected to the housing 206 (e.g. $GND_{body}$). In one or more embodiments, the reception circuit 210 may operate by receiving an uplink signal via the electric coupling $C_{tip}$ between the touchscreen 101 and the active tip 104, and converting the capacitance received at the active tip 104 to current via the amplifier circuit 214. The amplifier circuit 214 may generate the converted uplink signal based on the differences in potential between the uplink signal and the potential at $GND_{body}$. The amplifier circuit 214 may forward the converted uplink signal to the active stylus controller 208. The active stylus controller 208 may demodulate the converted uplink signal to acquire the data supplied through the uplink signal. In further embodiments, the converted uplink signal may be a digital signal or an analog signal, which may be processed by the active stylus controller 208. A person having ordinary skill in the art will be aware of other ways to obtain a demodulated signal.

In various embodiments, after the active stylus controller 208 processes the converted uplink signal, it may send a modulating signal to the transmission circuit 204 and move the switch 202 to O at the conclusion of the reception period (or vice versa).

FIG. 2C is the internal configuration of a transmission circuit of the active stylus according to an embodiment of the present application.

The transmission circuit 204 may comprise a signal generator 220 configured to generate a modulated downlink signal transmitted to the touchscreen 101 through the active tip 104. In one or more embodiments, the signal generator 220 may include a generation circuit that is configured to receive a CLK signal from an internal clock (or alternately an external clock) and generate a waveform. For example, the waveform generator may generate a wave, which may be a square wave, sawtooth wave or other waveforms. The signal generator 220, at the modulation circuit, receives a modulating signal, for example, from the active stylus controller 208, and generates a pulse width modulated (PWM) signal. For example, this may be performed by providing the modulating signal and the waveform to a comparator, i.e., the modulation circuit comprising the comparator. In further embodiments, the modulating signal may be a digital signal or an analog signal, which may be processed by the signal generator 220. A person having ordinary skill in the art will be aware of other ways to obtain a PWM signal.

In various embodiments, the signal generator 220 may be further connected to a level shifter circuit 218. The level shifter circuit 218 may be configured to translate the voltage domain of the pulse width modulated signal to allow for compatibility between the active stylus controller 208 and the touchscreen controller 114. The translated pulse width modulated downlink signal may then be transmitted through the active tip 104.

Figure 3:
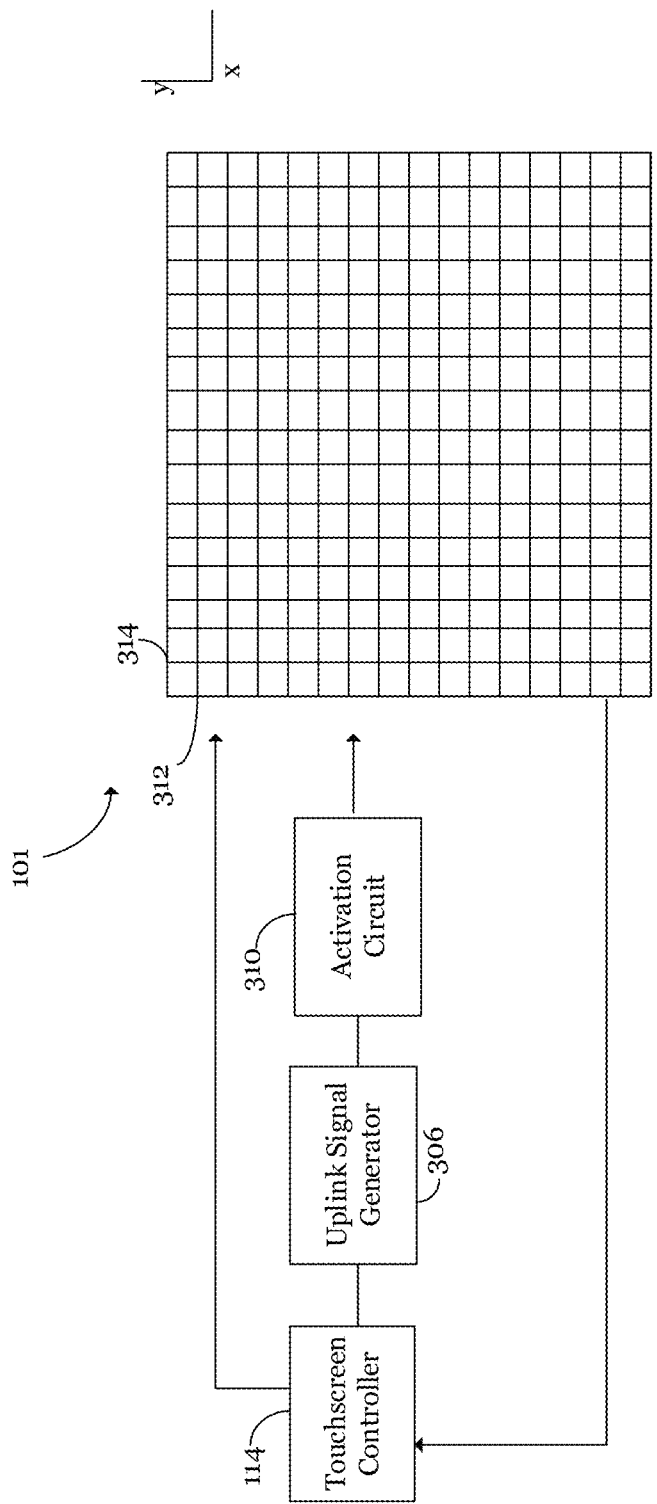
FIG. 3 is a schematic diagram of an electronic device according to an embodiment of the present application.

FIG. 3 is a schematic diagram of an electronic device according to an embodiment of the present application.

Referring to FIG. 3, a plurality of touch sensors may be arranged in rows and columns across the touchscreen 101. In various embodiments the touch sensors may be formed by electrically coupling the touchscreen 101 to rows of capacitive electrodes 312 and columns of capacitive electrodes 314 that span the entirety of the touchscreen 101. The rows of capacitive electrodes 312 may span the touchscreen in the x-direction. The columns of capacitive electrodes 314 may span the touchscreen in the y-direction. The rows of capacitive electrodes 312 and the columns of capacitive electrodes 314 have a measurable mutual capacitance at their intersections. In addition, each of the rows of capacitive electrodes 312 and each of the columns of capacitive electrodes 314 may have a self-capacitance that may be measured with respect to ground.

In various embodiments, as described above, the touchscreen 101 may be configured to periodically switch between a sensing mode and a transmission mode. During sensing mode, touch operations may be used to determine locations across the touchscreen 101 corresponding to passive touch (e.g. touch by the user or other capacitive objects) and a position of the active stylus 108. The sensing mode may last for a predetermined sensing duration. The predetermined sensing duration may be programmed according to the active stylus configuration and user experience needs. If the user wants to maximize the active stylus performance, the passive touch sensing duration may be set to a minimum, and the uplink signal will configure the active stylus and the bi-directional transmission protocol with the maximum downlink sensing duration.

In various embodiments, at the conclusion of the predetermined sensing period, the touchscreen 101 may enter a transmission mode. In one or more embodiments, during transmission mode, in response to the downlink signal, the touchscreen 101 may transmit an uplink signal to the active tip 104 during a predetermined transmission period. The predetermined transmission duration may be defined by the same default setting used by touchscreen controller and active stylus. The predetermined transmission duration may be changed in the configuration information embedded in the uplink signal. An example of the touchscreen-active-stylus transmission period is 8.3 ms, of which uplink transmission duration is 300 us, downlink transmission (that is, also active stylus sensing) duration is 4 ms and passive touch sensing is 4 ms.

Referring back to FIG. 3, the touchscreen controller 114 may be further coupled to an uplink signal generator 306, and an activation circuit 310.

The uplink signal generator 306 may be configured to generate and forward a first uplink signal or a second uplink signal to the activation circuit 310 during the transmission period. The first uplink signal may be a modulated signal. In one or more embodiments, uplink signal generator 306 may include a generation circuit that is configured to receive a CLK signal from an internal clock (or alternately an external clock) and generate a waveform. For example, the waveform generator may generate a wave, which may be a square wave, sawtooth wave or other waveforms. The uplink signal generator 306, at the modulation circuit, receives a modulating signal, for example, from the touchscreen controller 114, and generates a pulse width modulated (PWM) signal. The modulating signal may be based on the contents of the downlink signal received by the touchscreen controller 114. For example, this may be performed by providing the modulating signal and the waveform to a comparator, i.e., the modulation circuit comprising the comparator. In further embodiments, the modulating signal may be a digital signal or an analog signal, which may be processed by the signal generator 220.

The activation circuit 310 may comprise a selector array or selection circuit that is configured to select one or more rows or columns. For example, the selector array may have separate row selectors and column selectors. The activation circuit 310 may further receive instructions, e.g., from the touchscreen controller 114, on which rows and columns to be activated. The signal provided by the uplink signal generator 306 may then be asserted on the rows and columns to be activated.

In various embodiments, to overcome the weak grounding of the active stylus 108 discussed above, based on instructions from the touchscreen controller 114, the uplink signal generator 306 or the activation circuit 310, may be used to transform the first uplink signal into a second uplink signal having a different characteristic, transmit the first uplink signal to a first fraction, e.g., specific rows of capacitive electrodes 312 (or columns of capacitive electrodes 314) and the second uplink signal to a second fraction, e.g., the remaining rows of capacitive electrodes 312 (or columns of capacitive electrodes 314) to cancel out or reduce the change in potential at $GND_{body}$. For example, the second uplink signal may be generated by inverting the first uplink signal at an inverter to obtain a signal with an opposite polarity. While the first and second uplink signals have different polarities in one embodiment, other embodiments envision other types of relationships such as phase, frequency, and others.

The activation circuit 310 may select and drive one row of capacitive electrodes 312 and one column of capacitive electrodes 314 at the same time. Other embodiments envision various combinations of row and column selections; one row and two or more columns, two or more rows and two or more columns, and others. To overcome the weak grounding of the active stylus 108 discussed above, a fraction of rows of capacitive electrodes 312 are driven with the first uplink signal, remaining rows are driven with the second uplink signal, and a fraction of columns of capacitive electrodes 314 are driven with the first uplink signal, remaining columns are driven with the second uplink signal. In the next transmission period, the rows are driven the same signals as before while the signals that drives the two groups of columns are interchanged; that is, the fraction of columns are driven with the second uplink signal and the remaining columns are driven with the first uplink signal. Alternatively, the rows may be driven with combination of the first and the second uplink signals while one or more columns are driven with the same uplink signal as determined for the rows in the area without any passive touch.

Figure 4A:
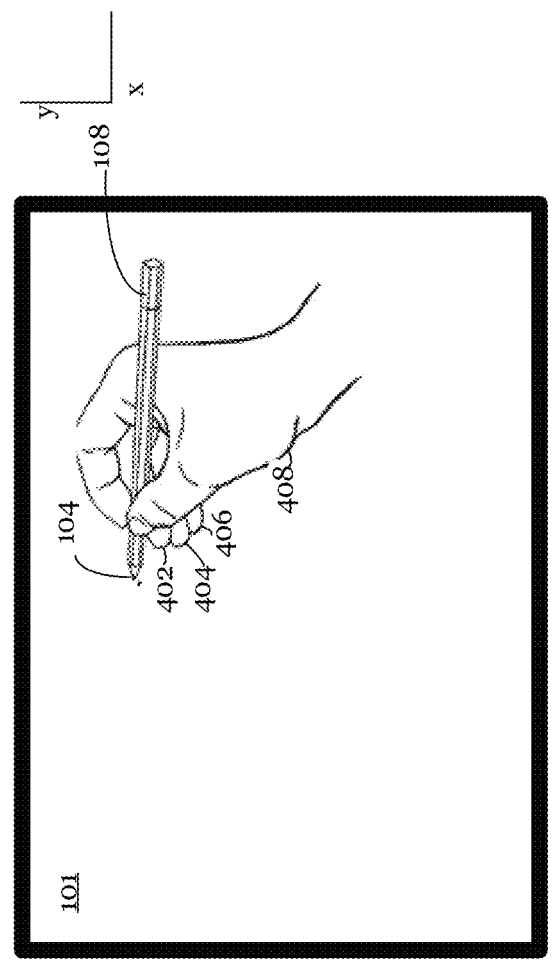
FIGS. 4A-4B is schematic illustrations of process steps of reducing the ground potential of a user's body when transmitting an uplink signal from the electronic device to an active stylus according to an embodiment of the present application, where
Figure 4B:
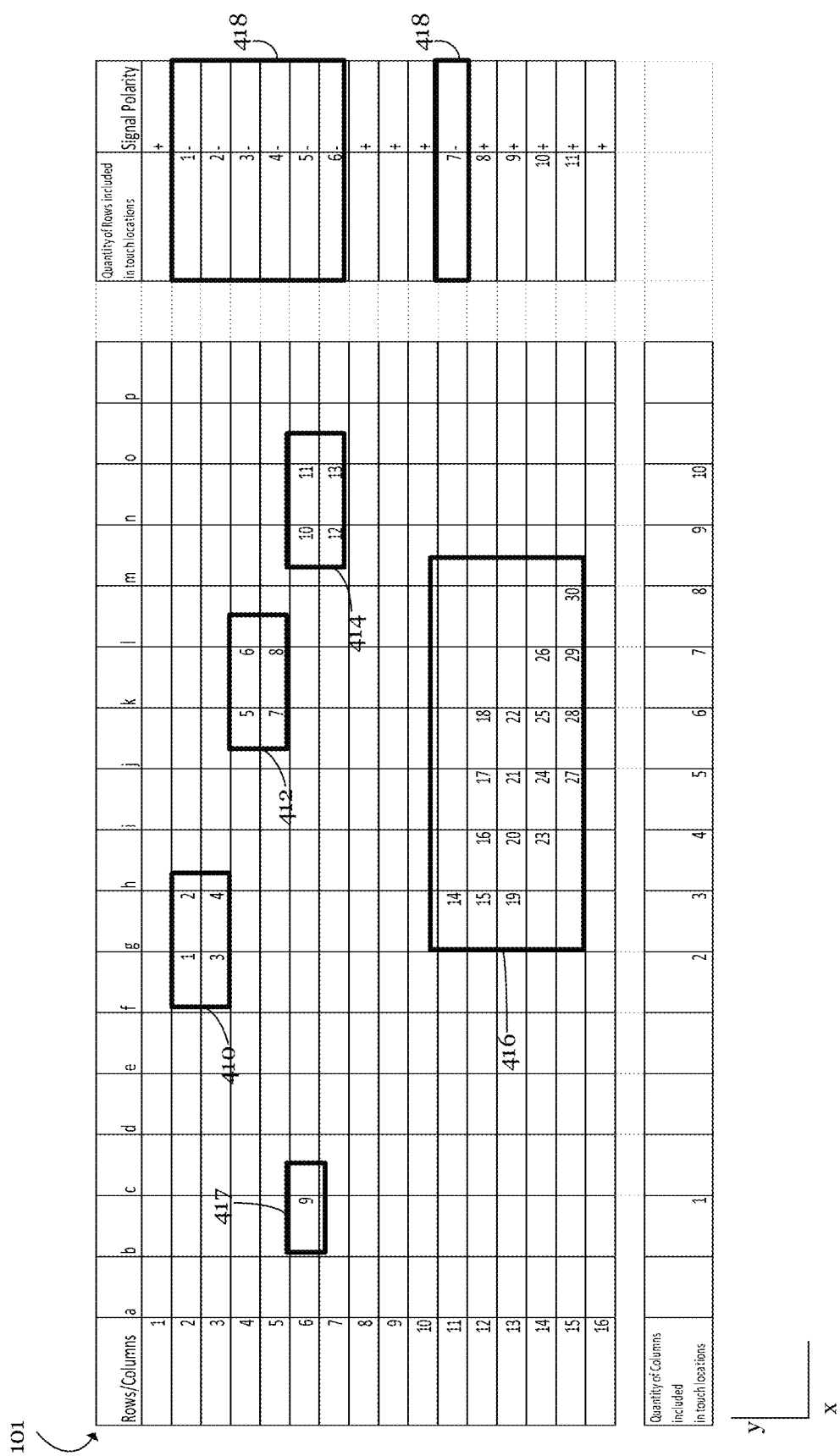
Figure 5:
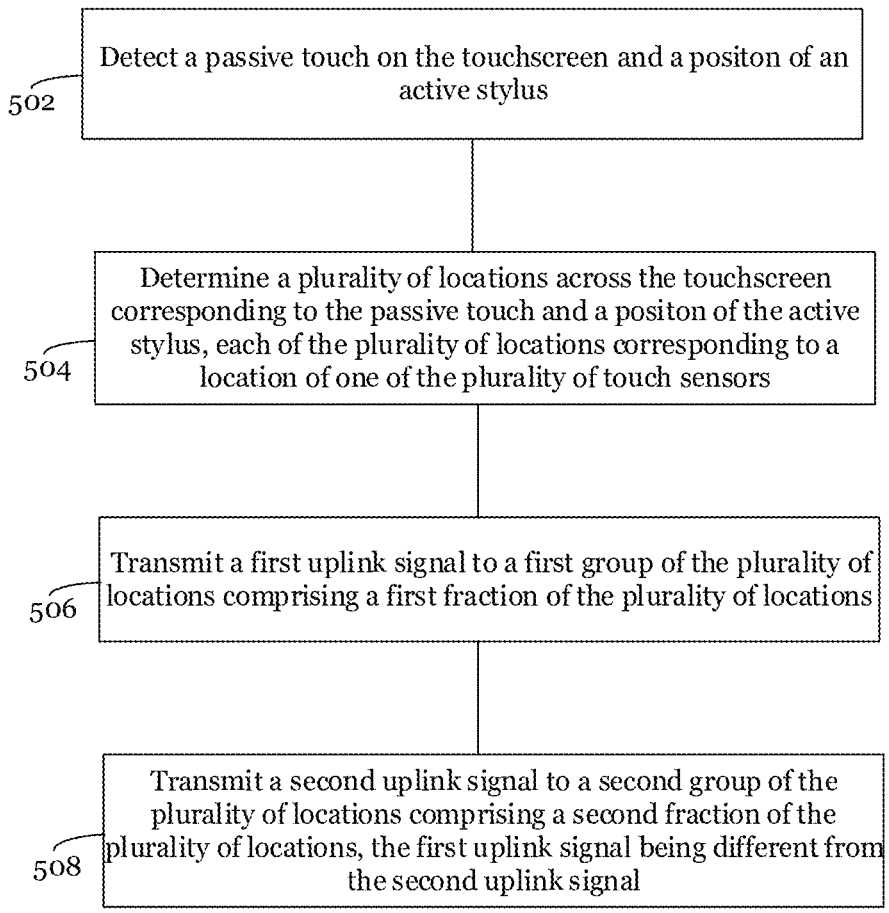
FIG. 5 illustrates a process flow of reducing the ground potential of a user's body when transmitting an uplink signal from the electronic device to the active stylus according to an embodiment of the present application.

FIGS. 4A-4B is schematic illustrations of process steps of reducing the ground potential of a user's body when transmitting an uplink signal from the electronic device to an active stylus according to an embodiment of the present application, where FIG. 4A is a view of the electronic device in use, and FIG. 4B a schematic of the readout of the touchscreen 101 of the electronic device. FIG. 5 illustrates a process flow of reducing the ground potential of a user's body when transmitting an uplink signal from the electronic device to the active stylus according to an embodiment of the present application.

FIG. 4A illustrates a schematic detailing of the electronic device 100 and an active stylus 108. Accordingly FIGS. 4A-4B may be discussed with reference to FIGS. 1-3. Referring to FIG. 4A the touchscreen 101 may detect passive touch and a position of an active stylus 108 (block 502 in FIG. 5). Specifically, the touchscreen 101 may detect the position of the active tip 104, and passive touch from the user's middle finger 402, the user's ring finger 404, user's pinky finger 406, and the user's right wrist 408.

FIG. 4B illustrates a schematic of the readout of the touchscreen 101 of the electronic device in FIG. 4A. As shown in FIG. 4B, the readout of the touchscreen 101 may include 16 rows of capacitive electrodes 312 arranged in the x-direction illustrated as rows 1-16, and 16 columns of capacitive electrodes 314 arranged in the y-direction illustrated as columns a-p. Although 16 rows and 16 columns of capacitive electrodes are illustrated in FIG. 4B, this is not indicative of the number of rows and columns of capacitive electrodes that may be formed across the touchscreen 101.

In one or more embodiments, a plurality of locations (numbered 1-30) measuring a touch, e.g., corresponding to passive touch by a user and a position of an active stylus 108 may be detected by the touchscreen 101. The plurality of locations may each correspond to a location of one of the plurality of touch sensors (block 504 in FIG. 5).

However, these touch operations of the touchscreen 101 have to be clearly distinguishable to decipher the position of the active stylus 108. Therefore, the touchscreen 101 may utilize capacitive sensing processes such as mutual and self-sensing to detect passive touches, and active sensing processes to detect the active stylus 108.

A mutual sensing process may include, using the touchscreen controller 114, driving each row of capacitive electrodes 312 with a sensing signal sequentially, and measuring, the change in capacitance due to a change in a dielectric medium between the intersecting electrodes of columns of capacitive electrodes 314 and a respective driven row capacitive electrodes 312 (or vice versa).

In other words, during the mutual sensing process, when a row of capacitive electrodes 312 is driven, when passive objects such as human fingers touch the touchscreen 101, there is detectable in change of the mutual capacitance at the intersections of the rows of capacitive electrodes 312 and columns of capacitive electrodes 314 where the touches occurred. Based on these changes in mutual capacitance, the touchscreen controller 114 can determine a plurality of locations comprising the coordinates (e.g. x and y coordinates) of intersecting electrodes of where the touchscreen 101 is detecting passive touch from the user.

Similarly, the touchscreen 101 may detect some types of user input using a self-sensing capacitive sensing process.

The self-sensing process operates by measuring a change in the sensed capacitance of each of the rows of capacitive electrodes 312 or each of the columns of capacitive electrodes 314. In other words, the self-sensing process may include the touchscreen controller 114 driving and scanning each of the individual rows of capacitive electrodes 312, each of the individual columns of capacitive electrodes 314, or both. When a human finger (or another passive object) is brought proximate to a driven row or column of electrodes it adds an additional capacitance that can be measured. Based on the changes in self-capacitance, the touchscreen controller 114 can determine a plurality of locations where the touchscreen 101 is detecting passive touch.

In order to detect a position of the active stylus 108, the touchscreen controller 114 may use an active sensing process. During an active sensing process the touchscreen 101 may detect a downlink signal transmitted through the active tip 104. In other words, using the process discussed in FIGS. 2A and 2C, a downlink signal may be generated by the active stylus 108 that is transmitted through the active tip 104. As the active tip 104 transmits the downlink signal, electric field lines are generated that may electrically couple the active tip 104 to intersecting electrodes and impart an additional capacitance. The touchscreen controller 114 may measure the capacitances at each intersection. Then, based on the measured capacitances, the touchscreen controller 114 may determine the coordinates (i.e. the x, y coordinates) of a location corresponding to the position of the active stylus 108. In one or more embodiments, due to the precision of the stylus, the active stylus 108 may be sensed at a single intersection of electrodes.

In various embodiments, the driving signals generated by the touchscreen controller 114 during the capacitive sensing processes and the downlink signal generated by the active stylus 108 may have different frequencies. For example, a driving signal with a frequency of 320 kHz may be used during mutual sensing, a driving signal with a frequency of 120 kHz may be used during self-sensing, and a downlink signal driven with a frequency of 200 kHz may be generated by the active stylus 108. In other embodiments, the position of the active stylus 108 may be differentiated by time-multiplexing the downlink signal generated by the active stylus 108, and the driving signals used during both capacitive sensing processes. For example, the predetermined sensing period may be divided into a capacitive sensing time period and an active sensing time period for detecting the active stylus 108.

Referring back to FIG. 4B, more than one location may correspond to passive touch because touch by a user is less precise than touch by an active stylus 108. In other words touch by a user may span across multiple intersections. Clusters of locations may correspond to each user touch. A first cluster 410 corresponds to touch from the user's middle finger 402, a second cluster 412 corresponds to touch from the user's ring finger 404, a third cluster 414 corresponds to touch from the user's pinky finger 406, and a fourth cluster 416 corresponds to touch from the right wrist 408. Due to the precise input of the active stylus 108, the active stylus spans a single touch location 417 (e.g. intersection).

In various embodiments, after determining the plurality of locations, the touchscreen controller 114 may determine a quantity of rows of capacitive electrodes 312 and a quantity of columns of capacitive electrodes 314 included in the plurality of locations. For example, the quantity of rows may be determined by counting the number of rows across the touchscreen 101 detecting at least one touch. Similarly, the quantity of columns of capacitive electrodes 314 may be determined by counting the number of columns across the touchscreen 101 that are detecting at least one touch.

After determining a quantity of rows of capacitive electrodes 312 and a quantity of columns of capacitive electrodes 314 included in the plurality of locations, the touchscreen controller 114 may determine whether the quantity of rows of capacitive electrodes 312 is greater than the quantity columns of capacitive electrodes 314 included in the plurality of locations. If the quantity of rows of capacitive electrodes 312 is greater than the quantity columns of capacitive electrodes 314 included in the plurality of locations, the touchscreen controller 114 determines a first group of rows of capacitive electrodes 314 and a second group of rows of capacitive electrodes 314. For example, the first group of rows may select rows 2-3 and 5-6 in FIG. 4B while a second group of rows may select rows 11-15 in FIG. 4B. If the quantity of rows of capacitive electrodes 312 is less than the quantity of columns of capacitive electrodes 314 included in the plurality of locations, the touchscreen controller 114 determines a first group of columns of capacitive electrodes 314 and a second group of columns of capacitive electrodes 314. For example, the first group of columns may select a columns b, f-g in FIG. 4B while a second group of rows may select columns j-k and m-n in FIG. 4B.

In various embodiments, the first group of the plurality of locations may comprise a first fraction of rows (or columns) including half or substantially half of the total number of the plurality of locations. For example, in the illustration in FIG. 4B, there are 30 locations. Preferably, the first group of the plurality of locations comprises half of the plurality of locations measuring a touch. However, because the first group of the plurality of locations comprises entire rows (or columns), it may not be possible to form a group of the plurality of locations that comprises exactly half of the locations. Therefore, in one or more embodiments, the first group of the plurality of locations may comprise as close to half of the touch locations as possible.

The first group of the plurality of locations may comprise only the rows of capacitive electrodes 312 (or columns of capacitive electrodes 314) that are included in the first fraction of the plurality of locations. The second group of the plurality of locations may comprise a second fraction including the rows of capacitive electrodes 312 (or columns of capacitive electrodes 314) that are not included in the first group of the plurality of touch locations.

For example, referring back to FIG. 4B, 11 rows (rows 2-7 and rows 10-15) are included in the plurality of locations, while 10 columns (column b and columns and f-n) are included in the plurality of locations. Therefore, the first group and the second group of the plurality of locations may comprise rows of capacitive electrodes 312 because there are more rows than columns.

However due to the distribution of the plurality of locations, the first group of the plurality of locations 418 cannot each include exactly half of the plurality of locations. Therefore, a first group of the plurality of locations 418 comprises rows 2-6 and 11, and therefore, includes 14 out of 30 locations. The second group of the plurality of locations comprises the remaining rows, and therefore, includes the remaining 16 locations.

In various embodiments, it is not necessary for the first group of rows (or columns) (i.e., first group of the plurality of locations 418) to comprise rows of capacitive electrodes 312 (or columns of capacitive electrodes 314) adjacent to each other. In other words, the activation circuit 310 is able to transmit either of the uplink signals to specific rows of capacitive electrodes 312 (or columns of capacitive electrodes 314). In one or more embodiments, the first group of the plurality of locations 418 may include the touch location corresponding to the position of the active stylus 417. In other embodiments, the first group of the plurality of locations 418 may not include the touch location corresponding to the position of the active stylus 417.

The first uplink signal may be transmitted to the first group of the plurality of locations 418 and a different, second uplink signal may be transmitted to the second group of the plurality of locations (blocks 506-508 in FIG. 5).

In various embodiments, as discussed above, the first uplink signal may be a signal generated by the uplink signal generator 306 based on a modulation signal received from the touchscreen controller 114. The first uplink signal may be configured to be transmitted through the touchscreen 101 to the active tip 104 of the active stylus 108. The first uplink signal may be forwarded from the uplink signal generator 306 to the activation circuit 310. The activation circuit 310 may be controlled by the touchscreen controller 114 to use its selector array to activate the rows and columns to assert.

As previously described, a second uplink signal may be generated by transforming the first uplink signal, e.g., by passing through an inverter that switches the polarity of the first uplink signal. In other embodiments, the transformation may rely on changing other characteristics of the first uplink signal such as phase. The transformation of the first uplink signal may be performed at the uplink signal generator 306 or the activation circuit 310 in various embodiments. The first uplink signal is then transmitted to the first group of the plurality of locations 418 and the second uplink signal to the second group of the plurality of locations.

The first uplink signal and the second uplink signal may have the exact same parameters except for opposite polarities in one embodiment. For example the first and second uplink signals may have the same frequency, amplitude, duty cycle, and the like. The first uplink signal and the second uplink signal may either have a positive or negative polarity, so long as they have an opposite polarity.

Referring back to FIG. 4B, the first group of the plurality of locations 418 receives a first uplink signal of a negative polarity, and the second group of the plurality of locations receives a second uplink signal of a positive polarity. Therefore, the touchscreen controller 114 is able to instruct the activation circuit 310 to transmit the first uplink signal to the first group of the plurality of locations 418, and transmit a second uplink signal of an opposite polarity to the second group of the plurality of locations. Advantageously, the second uplink signal may be subtracted from first uplink signal (or vice versa) reducing, or even canceling out, the change in potential of the user's body 116. In other words, both uplink signals are transmitted to $GND_{body}$, and due to their opposite polarities may reduce or eliminate the changes in potential felt by $GND_{body}$ allowing for the active stylus to detect the uplink signal.

In various embodiments, if the touch location corresponding to the active tip 417 is in the first group of the plurality of locations 418, the first uplink signal may be the uplink signal intended to be received by the active tip 104. In other embodiments, if the touch location corresponding to the active tip 417 is not included in the first group of the plurality of locations 418, the second uplink signal is intended to be received by the active tip 104.

Embodiments of the application also consider situations in which the quantity of rows of capacitive electrodes included in the plurality of locations is less than the quantity of columns included in the plurality of locations as described below with FIGS. 6A-6B.

Figure 6A:
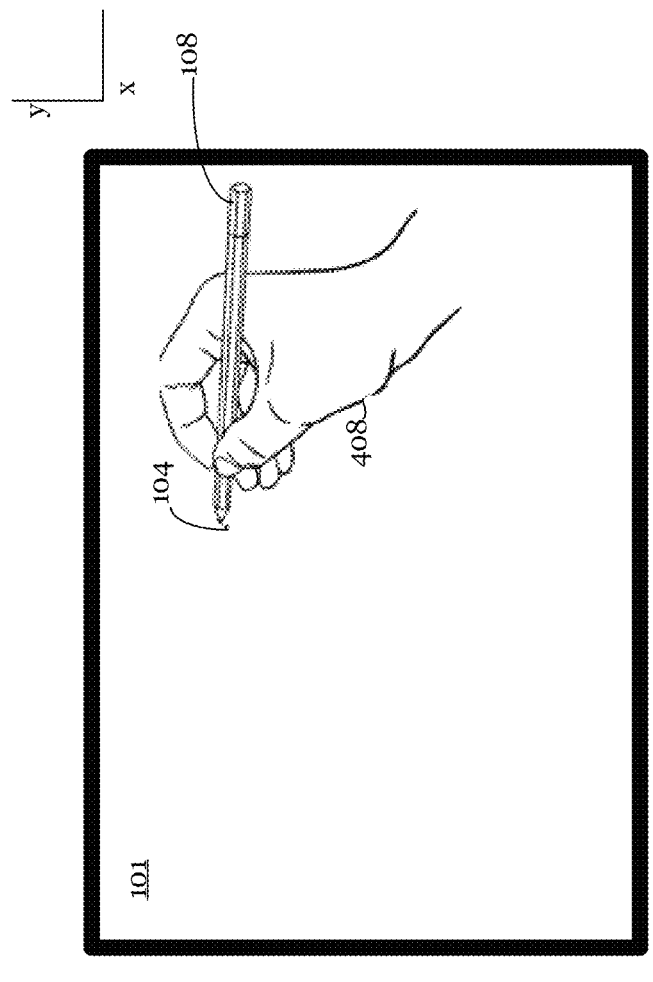
Figure 6B:
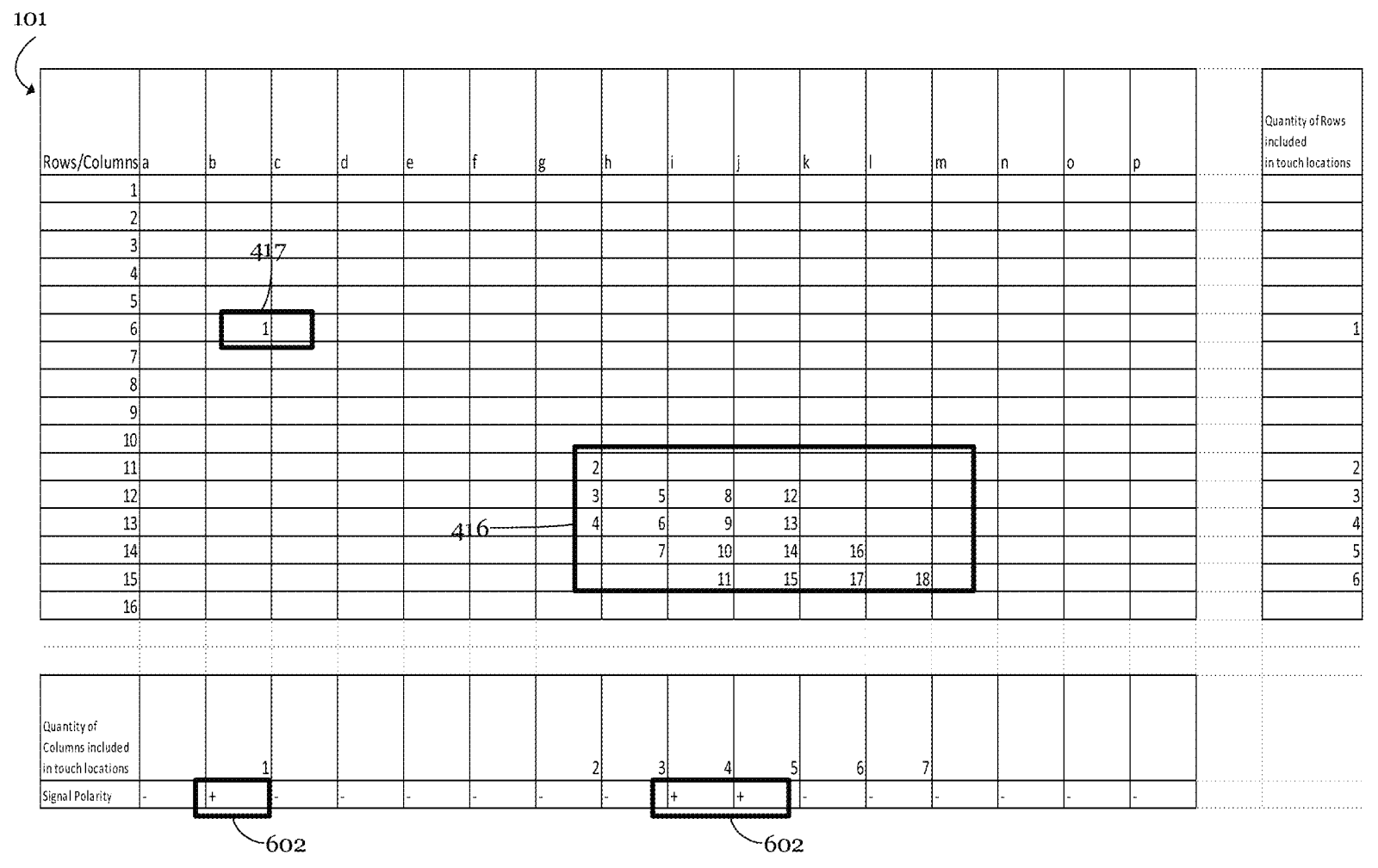

FIGS. 6A-6B is schematic illustrations of process steps of reducing the ground potential of a user's body when transmitting an uplink signal from the electronic device to an active stylus according to an embodiment of the present application, where FIG. 6A is a view of the electronic device in use, and FIG. 6B a schematic of the readout of the touchscreen of the electronic device.

FIG. 6A illustrates a schematic detailing of the electronic device 100 and an active stylus 108. Referring to FIG. 6A, the touchscreen 101 is touched by the active tip 104 and the user. Specifically, the touchscreen 101 is being touched by the active tip 104, and the user's right wrist 408.

FIG. 6B illustrates a schematic of the readout of the touchscreen 101 of the electronic device in FIG. 6A. Referring to FIG. 6B, the touchscreen 101 is detecting a single cluster of locations 416 corresponding to the user's right wrist 408, and a location corresponding to the position of the active tip 417.

As illustrated in FIG. 6B, the touchscreen controller 114 may determine that the quantity of rows of capacitive electrodes 312 included in the touch locations (e.g. 6) is less than the quantity of touch locations included in the plurality of columns of capacitive electrodes 314 (e.g. 7). Therefore, the touchscreen controller 114 may form a first and second group of the plurality of touch locations that include columns of capacitive electrodes 314. In the same manner described in FIG. 4B, the first group of the plurality of touch locations may include columns of capacitive electrodes 312 that are included in half or approximately half of the locations.

Referring back to FIG. 6B, the touchscreen controller 114 may determine the first group of the plurality of touch locations 602 comprises columns b, i, and j, because columns b, i, and j include 9 out of 18 locations.

Then in a similar manner discussed above, after determining the first group of the plurality of locations 602, the touchscreen controller 114 may instruct activation circuit 310 to transmit a first uplink signal to the first group of the plurality of locations 602 and a second uplink signal with an opposite polarity to a second group of the plurality of touch locations. The second group of the plurality of locations comprises the columns of capacitive electrodes 314 not included in the first group of the plurality of locations 602.

Example embodiments of the present invention are summarized here. Other embodiments can also be understood from the entirety of the specification and the claims filed herein.

Example 1. A method of sensing on a touchscreen including a plurality of touch sensors arranged in rows and columns on the touchscreen is described. The method includes detecting a passive touch on the touchscreen and a position of an active stylus; determining a plurality of locations across the touchscreen corresponding to the passive touch and a position of the active stylus, where each of the plurality of locations corresponds to a location of one of the plurality of touch sensors. The method includes transmitting a first uplink signal to a first group of the plurality of locations including a first fraction of the plurality of locations; and transmitting a second uplink signal to a second group of the plurality of locations including a second fraction of the plurality of locations, the first uplink signal being different from the second uplink signal.

Example 2. The method of example 1, where the first uplink signal and the second uplink signal have opposite polarities.

Example 3. The method of one of examples 1 or 2, further including: determining a quantity of rows included in the plurality of locations is greater than a quantity of columns of included in the plurality of locations; determining the first group of the plurality of locations including a first set of rows included in the first fraction of the plurality of locations, where transmitting the first uplink signal includes transmitting the first uplink signal to the first set of rows; and determining the second group of the plurality of locations including a second set of rows included in the second fraction of the plurality of locations, where transmitting the second uplink signal includes transmitting the second uplink signal to the second set of rows.

Example 4. The method of one of examples 1 or 2, further including: determining a quantity of rows included in the plurality of locations is less than a quantity of columns of included in the plurality of locations; determining the first group of the plurality of locations including a first set of columns included in the first fraction of the plurality of locations, where transmitting the first uplink includes transmitting the first uplink signal to the first set of columns; and determining the second group of the plurality of locations including a second set of columns included in the second fraction of the plurality of locations, where transmitting the second uplink signal includes transmitting the second uplink signal to the second set of columns.

Example 5. The method of one of examples 1 to 4, where detecting the position of the active stylus further includes: transmitting, from an active tip of the active stylus, a downlink signal to the touchscreen; capacitively sensing the downlink signal at one of the plurality of touch sensors; and determining a position of the active stylus based on the sensing.

Example 6. The method of one of examples 1 to 5, where detecting the passive touch on the touchscreen further includes: sensing a change in capacitance, at one of the plurality of touch sensors, at a frequency different than the frequency of the downlink signal.

Example 7. The method of one of examples 1 to 6, where the total number of locations in the first fraction of the plurality of locations is substantially equal to the total number of locations in the second fraction of the plurality of locations.

Example 8. A method of operating an electronic device includes determining a touchscreen is detecting passive touch and touch from an active stylus at a plurality of locations corresponding to a plurality of intersections between rows and columns of capacitive electrodes arranged across the touchscreen; determining a quantity of rows of capacitive electrodes and a quantity of columns of capacitive electrodes included in the plurality of locations; determining whether the quantity of rows of capacitive electrodes included in the plurality of locations is greater than the quantity of columns of capacitive electrodes included in the plurality of locations; determining a group of capacitive electrodes including a first fraction of the plurality of locations based on determining that the quantity of rows of capacitive electrodes included in the plurality of locations is greater than the quantity of columns of capacitive electrodes included in the plurality of locations, where the group of capacitive electrodes includes a location corresponding to the touch from an active stylus; transmitting a first uplink signal to the group of capacitive electrodes; and transmitting a second uplink signal to the remaining capacitive electrodes, the first uplink signal and the second uplink signal having opposite polarities.

Example 9. The method of example 8, where the first uplink signal is configured to include data to be sent to the active stylus.

Example 10. The method of one of examples 8 or 9, further including: determining that the quantity of rows of capacitive electrodes included in the plurality of locations is greater than the quantity of columns of capacitive electrodes included in the plurality of locations; and based on the determination that the quantity of rows of capacitive electrodes included in the plurality of locations is greater than the quantity of columns of capacitive electrodes included the plurality of locations, determining that the group of capacitive electrodes includes the rows of capacitive electrodes included in half or approximately half of the locations and the remaining capacitive electrodes includes the rows of capacitive electrodes not included in the group of capacitive electrodes.

Example 11. The method of one of examples 8 or 9, further including: determining that the quantity of columns of capacitive electrodes included in the plurality of locations is greater than the quantity of rows of capacitive electrodes included in the plurality of locations; and based on the determination that the quantity of columns of capacitive electrodes included in the plurality of locations is greater than the quantity of rows of capacitive electrodes included in the plurality of locations, determining that the group of capacitive electrodes includes the columns of capacitive electrodes included in half or approximately half of the plurality of locations and remaining capacitive electrodes includes the columns of capacitive electrodes not included in the group of capacitive electrodes.

Example 12. The method of one of examples 8 to 11 where, detecting touch from the active stylus further includes: transmitting, from an active tip of the active stylus, a downlink signal having a first frequency to the touchscreen; scanning each of the rows and columns of capacitive electrodes across the touchscreen; and determining a location of the plurality of locations by detecting a change in capacitance between an intersection of capacitive electrodes.

Example 13. The method of one of examples 8 to 12, where, detecting passive touches includes: driving each of the rows of capacitive electrodes sequentially using a second frequency; scanning each of the columns of capacitive electrodes and measuring the change in capacitance at each intersection between each of the columns of capacitive electrodes and each of the rows of capacitive electrodes; and detecting a plurality of touch locations based on the change in capacitance at each intersection between the rows and columns of capacitive electrodes and the second frequency.

Example 14. The method of one of examples 8 to 13 where detecting passive touches further includes: I driving, with a third frequency, and scanning each of the columns of capacitive electrodes and measuring a self-capacitance of each of the columns of capacitive electrodes with respect to ground, where each of the columns of capacitive electrodes are driven with a third frequency; and determining passive touches at a plurality of touch locations based on the self-capacitance of each of the columns of capacitive electrodes with respect to ground and the third frequency.

Example 15. An electronic device includes: a touchscreen; a processor; a memory for storing a program to be executed in the processor. The program includes instructions when executed cause the processor to: detect a passive touch on the touchscreen and a position of an active stylus; determine a plurality of locations across the touchscreen corresponding to the passive touch and a position of the active stylus, each of the plurality of locations corresponding to a location of one of the plurality of touch sensors; transmit a first uplink signal to a first group of the plurality of locations including a first fraction of the plurality of locations; and transmit a second uplink signal to a second group of the plurality of locations including a second fraction of the plurality of locations, the first uplink signal being different from the second uplink signal.

Example 16. The device of example 15, where the first uplink signal and the second uplink signal have opposite polarities.

Example 17. The device of one of examples 15 or 16, the program further including instructions to: determine a quantity of rows included in the plurality of locations is greater than a quantity of columns of included in the plurality of locations; determine the first group of the plurality of locations including a first set of rows included in the first fraction of the plurality of locations, where transmitting the first uplink signal includes transmitting the first uplink signal to the first set of rows; and determine the second group of the plurality of locations including a second set of rows included in the second fraction of the plurality of locations, where transmitting the second uplink signal includes transmitting the second uplink signal to the second set of rows.

Example 18. The device of one of examples 15 to 17, the program further including instructions to: determine a quantity of rows included in the plurality of locations is less than a quantity of columns of included in the plurality of locations; determine the first group of the plurality of locations including a first set of columns included in the first fraction of the plurality of locations, where transmitting the first uplink includes transmitting the first uplink signal to the first set of columns; and determine the second group of the plurality of locations including a second set of columns included in the second fraction of the plurality of locations, where transmitting the second uplink signal includes transmitting the second uplink signal to the second set of columns Example 19. The device of one of examples 15 to 18, where instructions to detect the position of the active stylus further include instructions to: transmit, from an active tip of the active stylus, a downlink signal to the touchscreen; capacitively sense the downlink signal at one of the plurality of touch sensors; and determine a position of the active stylus based on the sensing.

Example 20. The device of one of examples 15 to 19, where instructions to detect the passive touch on the touchscreen further include instructions to: sense a change in capacitance, at one of the plurality of touch sensors, at a frequency different than the frequency of the downlink signal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of sensing on a touchscreen comprising a plurality of touch sensors arranged in rows and columns on the touchscreen, the method comprising:
   detecting a passive touch on the touchscreen and a position of an active stylus;
   determining a plurality of locations across the touchscreen corresponding to the passive touch and a position of the active stylus, each of the plurality of locations corresponding to a location of one of the plurality of touch sensors;
   transmitting a first uplink signal to a first group of the plurality of locations comprising a first fraction of the plurality of locations; and
   transmitting a second uplink signal to a second group of the plurality of locations comprising a second fraction of the plurality of locations, the first uplink signal being different from the second uplink signal, and the first group of the plurality of locations being different from the second group of the plurality of locations.

2. The method of claim 1, wherein the first uplink signal and the second uplink signal have opposite polarities.

3. The method of claim 1, further comprising:
   determining a quantity of rows included in the plurality of locations is greater than a quantity of columns of included in the plurality of locations;
   determining the first group of the plurality of locations comprising a first set of rows included in the first fraction of the plurality of locations, wherein transmitting the first uplink signal comprises transmitting the first uplink signal to the first set of rows; and
   determining the second group of the plurality of locations comprising a second set of rows included in the second fraction of the plurality of locations, wherein transmitting the second uplink signal comprises transmitting the second uplink signal to the second set of rows.

4. The method of claim 1, further comprising:
   determining a quantity of rows included in the plurality of locations is less than a quantity of columns of included in the plurality of locations;
   determining the first group of the plurality of locations comprising a first set of columns included in the first fraction of the plurality of locations, wherein transmitting the first uplink comprises transmitting the first uplink signal to the first set of columns; and
   determining the second group of the plurality of locations comprising a second set of columns included in the second fraction of the plurality of locations, wherein transmitting the second uplink signal comprises transmitting the second uplink signal to the second set of columns.

5. The method of claim 1, wherein detecting the position of the active stylus further comprises:
   transmitting, from an active tip of the active stylus, a downlink signal to the touchscreen;
   capacitively sensing the downlink signal at one of the plurality of touch sensors; and
   determining a position of the active stylus based on the sensing.

6. The method of claim 5, wherein detecting the passive touch on the touchscreen further comprises:
   sensing a change in capacitance, at one of the plurality of touch sensors, at a frequency different than the frequency of the downlink signal.

7. The method of claim 1, wherein the total number of locations in the first fraction of the plurality of locations is substantially equal to the total number of locations in the second fraction of the plurality of locations.

8. A method of operating an electronic device, the method comprising:
   determining a touchscreen is detecting passive touch and touch from an active stylus at a plurality of locations corresponding to a plurality of intersections between rows and columns of capacitive electrodes arranged across the touchscreen;
   determining a quantity of rows of capacitive electrodes and a quantity of columns of capacitive electrodes included in the plurality of locations;
   determining whether the quantity of rows of capacitive electrodes included in the plurality of locations is greater than the quantity of columns of capacitive electrodes included in the plurality of locations;
   determining a group of capacitive electrodes including a first fraction of the plurality of locations based on determining that the quantity of rows of capacitive electrodes included in the plurality of locations is greater than the quantity of columns of capacitive electrodes included in the plurality of locations, wherein the group of capacitive electrodes includes a location corresponding to the touch from an active stylus;
   transmitting a first uplink signal to the group of capacitive electrodes; and
   transmitting a second uplink signal to the remaining capacitive electrodes, the first uplink signal and the second uplink signal having opposite polarities.

9. The method of claim 8, wherein the first uplink signal is configured to include data to be sent to the active stylus.

10. The method of claim 8, further comprising:
    determining that the quantity of rows of capacitive electrodes included in the plurality of locations is greater than the quantity of columns of capacitive electrodes included in the plurality of locations; and
    based on the determination that the quantity of rows of capacitive electrodes included in the plurality of locations is greater than the quantity of columns of capacitive electrodes included the plurality of locations, determining that the group of capacitive electrodes comprises the rows of capacitive electrodes included in half or approximately half of the locations and the remaining capacitive electrodes comprises the rows of capacitive electrodes not included in the group of capacitive electrodes.

11. The method of claim 8, further comprising:

determining that the quantity of columns of capacitive electrodes included in the plurality of locations is greater than the quantity of rows of capacitive electrodes included in the plurality of locations; and based on the determination that the quantity of columns of capacitive electrodes included in the plurality of locations is greater than the quantity of rows of capacitive electrodes included in the plurality of locations, determining that the group of capacitive electrodes comprises the columns of capacitive electrodes included in half or approximately half of the plurality of locations and remaining capacitive electrodes comprises the columns of capacitive electrodes not included in the group of capacitive electrodes.

12. The method of claim 8 wherein, detecting touch from the active stylus further comprises:

transmitting, from an active tip of the active stylus, a downlink signal having a first frequency to the touchscreen;

scanning each of the rows and columns of capacitive electrodes across the touchscreen;

and determining a location of the plurality of locations by detecting a change in capacitance between an intersection of capacitive electrodes.

13. The method of claim 12, wherein, detecting passive touches comprises:

driving each of the rows of capacitive electrodes sequentially using a second frequency;

scanning each of the columns of capacitive electrodes and measuring the change in capacitance at each intersection between each of the columns of capacitive electrodes and each of the rows of capacitive electrodes; and detecting a plurality of touch locations based on the change in capacitance at each intersection between the rows and columns of capacitive electrodes and the second frequency.

14. The method of claim 13 wherein detecting passive touches further comprises:

driving, with a third frequency, and scanning each of the columns of capacitive electrodes and measuring a self-capacitance of each of the columns of capacitive electrodes with respect to ground, wherein each of the columns of capacitive electrodes are driven with a third frequency; and determining passive touches at a plurality of touch locations based on the self-capacitance of each of the columns of capacitive electrodes with respect to ground and the third frequency.

15. An electronic device comprising:

a touchscreen;

a processor;

a memory for storing a program to be executed in the processor, the program comprising instructions when executed cause the processor to:

detect a passive touch on the touchscreen and a position of an active stylus;

determine a plurality of locations across the touchscreen corresponding to the passive touch and a position of the active stylus, each of the plurality of locations corresponding to a location of one of a plurality of touch sensors;

transmit a first uplink signal to a first group of the plurality of locations comprising a first fraction of the plurality of locations; and transmit a second uplink signal to a second group of the plurality of locations comprising a second fraction of the plurality of locations, the first uplink signal being different from the second uplink signal, and the first group of the plurality of locations being different from the second group of the plurality of locations.

16. The device of claim 15, wherein the first uplink signal and the second uplink signal have opposite polarities.

17. The device of claim 15, the program further comprising instructions to:

determine a quantity of rows included in the plurality of locations is greater than a quantity of columns of included in the plurality of locations;

determine the first group of the plurality of locations comprising a first set of rows included in the first fraction of the plurality of locations, wherein transmitting the first uplink signal comprises transmitting the first uplink signal to the first set of rows; and determine the second group of the plurality of locations comprising a second set of rows included in the second fraction of the plurality of locations, wherein transmitting the second uplink signal comprises transmitting the second uplink signal to the second set of rows.

18. The device of claim 15, the program further comprising instructions to:

determine a quantity of rows included in the plurality of locations is less than a quantity of columns of included in the plurality of locations;

determine the first group of the plurality of locations comprising a first set of columns included in the first fraction of the plurality of locations, wherein transmitting the first uplink comprises transmitting the first uplink signal to the first set of columns; and determine the second group of the plurality of locations comprising a second set of columns included in the second fraction of the plurality of locations, wherein transmitting the second uplink signal comprises transmitting the second uplink signal to the second set of columns.

19. The device of claim 15, wherein instructions to detect the position of the active stylus further comprise instructions to:

transmit, from an active tip of the active stylus, a downlink signal to the touchscreen;

capacitively sense the downlink signal at one of the plurality of touch sensors; and determine a position of the active stylus based on the sensing.

20. The device of claim 15, wherein instructions to detect the passive touch on the touchscreen further comprise instructions to:

sense a change in capacitance, at one of the plurality of touch sensors, at a frequency different than the frequency of the downlink signal.

* * * * *